United States Patent [19]

Kaule et al.

[11] Patent Number: 4,892,336

[45] Date of Patent: Jan. 9, 1990

[54] ANTIFALSIFICATION DOCUMENT HAVING A SECURITY THREAD EMBEDDED THEREIN AND A METHOD FOR PRODUCING THE SAME

[75] Inventors: Wittich Kaule, Emmering; Jurgen Moll, Grunwald; Gerhard Schwenk, Puchheim; Gerhard Stenzel, Munich, all of Fed. Rep. of Germany

[73] Assignee: GAO Gesellschaft fuer Automation und Organisation mbH, Munich, Fed. Rep. of Germany

[21] Appl. No.: 27,552

[22] Filed: Mar. 18, 1987

[30] Foreign Application Priority Data

Mar. 18, 1986 [DE] Fed. Rep. of Germany ....... 3609090

[51] Int. Cl.$^4$ .......................... B42D 15/00; G09F 3/00; G02B 5/18; G02B 1/10
[52] U.S. Cl. ...................... 283/91; 283/113; 350/162.2; 350/164
[58] Field of Search ................... 283/6, 7, 11, 17, 9 R, 283/58, 74, 82, 85, 87, 91, 94, 113, 900; 346/1.1, 76 L; 350/105, 162.2, 164; 252/79.5; 430/275, 276, 278, 290, 356

[56] References Cited

U.S. PATENT DOCUMENTS

| 3,190,178 | 6/1965 | McKenzie | 40/616 |
| 3,241,429 | 3/1966 | Rice et al. | 350/16 X |
| 3,884,554 | 5/1975 | Lemelson | 350/16 X |
| 4,184,700 | 1/1980 | Greenaway . | |
| 4,186,943 | 2/1980 | Lee . | |
| 4,200,875 | 4/1980 | Galanos | 283/113 |
| 4,362,909 | 12/1982 | Snijders et al. . | |
| 4,417,784 | 11/1983 | Knop et al. | 283/91 |
| 4,652,015 | 3/1987 | Crane | 283/91 |
| 4,708,436 | 11/1987 | Kleinknecht | 350/162.2 |
| 4,708,920 | 11/1987 | Orensteen et al. | 283/91 |

FOREIGN PATENT DOCUMENTS

| 214838 | 10/1908 | Fed. Rep. of Germany . |
| 1446851 | 11/1968 | Fed. Rep. of Germany . |
| 1696245 | 3/1974 | Fed. Rep. of Germany . |
| 2743019 | 3/1978 | Fed. Rep. of Germany . |
| 2555214 | 4/1978 | Fed. Rep. of Germany . |
| 3013238 | 10/1981 | Fed. Rep. of Germany . |

Primary Examiner—Frank T. Yost
Assistant Examiner—Paul M. Heyrana, Sr.
Attorney, Agent, or Firm—Robert J. Koch

[57] ABSTRACT

The present invention relates to an antifalsification document having an embedded secutiry thread, and to a method for producing the same. This security thread is transparent and has a printed pattern on one side and, on the opposite side, a lenticular structure coordinated with the printed pattern. Such threads change their appearance when the viewing angle changes. To produce the security threads, a transparent film impressed with the desired lenticular relief is directed to a printing apparatus in exact register via guide elements having a relief structure that is negative with respect to the film impression, and then divided in a cutting apparatus into individual threads.

22 Claims, 4 Drawing Sheets

ANTIFALSIFICATION DOCUMENT HAVING A SECURITY THREAD EMBEDDED THEREIN AND A METHOD FOR PRODUCING THE SAME

BACKGROUND OF THE INVENTION

1. Field of the Invention

The present invention relates to an antifalsification document having a security thread embedded within the document.

2. Description of the Related Technology

To increase the antifalsification quality of security paper, identification cards, documents, etc., one of the security features known is to incorporate therein a security thread. In the case of paper products, the thread is introduced, for example, into the furnish layer as it is being formed during the manufacture of the paper, while in the case of multilayered synthetic products it is embedded between two individual layers. Such security threads may, for example, be compounded with mechanically testable additives (German "offenlegungsschrift" No. 16 96 245) or have certain optical properties, such as coloration that differs in transmission and reflection (German "offenlegungsschrift" No. 27,43 019).

It is also known to print writing, for example, on security threads. Lengths of film are first printed and then cut into strips. Since it is very difficult to cut the film so as to register exactly with the printed pattern, the distance between the individual areas of writing and the width of the threads are selected in such a way that one area of writing is at least always completely located on the cut thread (German "offenlegungsschrift" No. 14 46 851).

Further, it is also known to provide documents with security threads having an optically varying structure, such as a diffraction grid (German Pat. No. 25 55 214, German "offenlegungsschrift" No. 30 18 238).

Thus, the antifalsification document contains a feature that cannot be imitated in this form by photographic reproduction or copying techniques.

The known protection means have proved to be disadvantageous in that they are testable either only mechanically or only under special lighting conditions, that the optical effects can be detected by a viewer only very weakly, only using aids or even only if the viewer is an expert. In many cases it thus suffices to equip forged documents with simple lower-quality plagiarisms to simulate authenticity. Such threads are therefore less suitable as authenticity features capable of being easily tested visually.

SUMMARY OF THE INVENTION

The invention is thus based on the problem of proposing a security thread for antifalsification documents which is capable of being easily tested visually without technical aids, and has properties which are lost when the document is reproduced photographically or by copying techniques, and of providing a method for producing such security threads.

According to the invention an antifalsification document is advantageously provided with a security thread embedded within the document. The security thread is advantageously made of a transparent material exhibiting a printed pattern and an optically effective structure of configuration in a layer area spaced away from the printed pattern and defining the outer surface area of the security thread which has the effect that different areas of the printed pattern are recognizable at different viewing angles when the printed pattern is viewed through this structure. The printed pattern and optical structure is designed in such a way that the optical appearance of the security thread changes when the viewing angle changes. The security thread is produced by processing films in exact register where the processing includes at least two mutually independent processing steps and the film being processed in the second and optionally in subsequent processing steps is held in exact register with the first processing step. A relief structure capable of being picked up mechanically is provided in the film in the first processing step and at least part of this relief structure are used as guide elements for processing the film in exact register in the subsequent processing steps. The tools used in the subsequent processing step are equipped at selected places with guide elements displaying a relief structure that is negative with respect to the parts of the film relief structure in order to guide the film.

The inventive security thread, which is made of a transparent material, preferably synthetic material, generally has a rectangular cross-sectional structure and a width of approx. 0.5 mm to 2 mm, whereby in a preferred embodiment a screen made of a plurality of parallel cylinder lenses is impressed on one surface. The thickness of the security thread is selected so as to correspond approximately to the focal length of the cylinder lenses. The opposite surface is provided with a printed pattern. The printed pattern is designed with consideration of the optical properties of the cylinder lenses. Due to the focusing effect of the cylinder lenses and the position of the printed pattern on the plane of focus, different areas of the printed pattern are visible depending on the viewing angle. By designing the printed pattern accordingly, one can therefore provide information which is only visible at certain viewing angles. However, one may also produce "moving" images, designing the printed pattern in such a way that when the document is turned about an axis parallel to the cylinder lenses, a motive moves almost continuously from one place on the security thread to another.

One must therefore make sure during the manufacture of these security threads that the printed strips are provided on the carrier sheet in precise alignment with the cylinder lenses. In particular when cylinder lenses are used which have a small lens width ($<100\mu$), it is an exacting task to produce a correspondingly fine printed pattern and print the individual stripe images in exact register with the cylinder lenses.

However, special printing techniques (e.g. the film intaglio or cup intaglio techniques) and appropriate methods which are also the object of the present invention make it possible to produce so-called microprints and provide them on the carrier in exact register with the cylinder lenses. Thus, it is now possible to use such elements as security elements and embed them in antifalsification documents in the form of threads. Due to its difficult technical design, this thread is characterized by particularly high antifalsification quality.

The inventive security thread also has the advantage that it can be provided with a microprint of high security quality, whereby this printing, which is very difficult to break up with the naked eye, is testable without any technical aids since it is now enlarged by cylinder lenses located thereabove.

The security thread can be embedded in the antifalsification document by the conventional methods.

When it is embedded in paper, its visibility is preferably improved by the presence of windows in the paper layer that covers the thread. Security paper having threads exposed in the window area and methods for producing the same are disclosed, for example, in German patent no. 214 838, German Pat. No. 341 970 or German "offenlegungsschrift" No. 27 43 019. However, the thread may also be embedded so as to be covered by only a thin paper layer, that barely impairs the visibility of the thread.

The paper layer located thereabove simultaneously protects the surface structure of the thread from abrasion. Furthermore, especially those threads which extend at right angles to the cylinder lenses adhere very well in the paper, since the thread structure and the paper fiber structure mesh. Such a thread cannot be "pulled out" of the paper without destroying the sheet.

The threads themselves are preferably produced by first impressing the cylinder lens screen on wide film lengths and then printing the printed pattern on the opposite side of the film. These film lengths are then cut into individual strips having the desired security thread width.

These cylinder lenses are used according to the invention for aligning and adjusting the film in the subsequent processing steps (printing, cutting). For this purpose, the guide elements (rolls, drums, etc.) of the tools used in these steps, such as the printing and cutting apparatus, are designed to have a relief structure complementary to the lenticular screen. When the film passes through these guide elements, the lenticular screen and the relief structure mesh, so that the film passing through can be printed, cut or otherwise processed in precise geometrical correlation with the lenticular screen.

The inventive method makes it possible for films to be printed in a simple manner, above all over great lengths, in exact register with an embossed structure located on the opposite side. In the same way this embossed structure can also be utilized for cutting the film in exact register into single strips which can then be embedded as security threads in identification cards or blank notes.

This method can also be used to produce other security threads with small widths (approx. 0.5 mm) which exhibit, for example, an optionally polychrome printed pattern extending lengthwise on the thread. In the first procedural step, grooves are impressed in a film, spaced in accordance with the desired width of the security threads. Printing is then performed with the film aligned relative to the printing units with reference to these grooves, a printed pattern being provided, for example, on the smooth film surface opposite the grooves. After the printing process the film is cut into single strips again in relation to the position of the grooves. The film strips thus produced then have a printed pattern positioned precisely with respect to the outer dimensions of the strips.

Further advantages and advantageous developments According to the invention the optically effective structure of the security thread may advantageously be a relief structure of one or more individual lenses. The optically effective structures may be partially transparent surface layer areas, such as printed-on screen structures, that create a diaphragm effect and are composed of transparent and opaque areas. The thread may have a substantially rectangular cross-section and the printed pattern and the structure are present on two opposite surfaces of the security thread. The thread may have an opticlly effective structure on two opposite surfaces, and the printed pattern may be disposed on an inner layer plane of the security thread that is substantially parallel to these surfaces. The antifalsification document may advantageously have at least partially transparent areas or openings in the area of the security thread. The security thread may be superimposed only by a thin paper layer which is substantially transparent. The individual lenses may be cylinder lenses which extend lengthwise or crosswise to the direction of the thread. The printed pattern may be designed in such a way that in a certain viewing angle range a piece of information can be detected which is not visible when viewed outside this angle range. The printed information may be a certain coloration, or writing. The printed pattern may be designed in such a way that a piece of information appears at locally different places on the security thread at different viewing angles.

The production method may include the steps of printing, separating, milling and/or impressing the film. A screen exhibiting a plurality of cylinder lenses disposed parallel one beside the other may be impressed in the film, whereby at least some of these cylinder lenses serve as guide elements. One or more printed patterns, made of a plurality of stripes printed parallel to the cylinder lenses, may advantageously be provided on the surface of the film opposite the cylinder lenses so as to register exactly with the cylinder lenses, in such a way that these stripes are visible separately at different viewing angles due to the focusing effect of the cylinder lenses. Subsequent to the printing process the film may be cut into individual strips by two meshing cutter blocks comprising a plurality of individual disks, the front of the disks which come in contact with the impressed side of the film advantageously have depressions coordinated with the cylinder lens profiles. During production the film may be printed in a plurality of steps, whereby the individual printing units for the individual steps contain apparatus with corresponding negative groove patterns for guiding the film. The film may have different colors printed thereon in the individual steps or have a microprint printed thereon.

BRIEF DESCRIPTION OF THE DRAWINGS

FIG. 1 shows an inventive antifalsification document 1 in a cross-sectional view. The antifalsification document is, for example, a bank note or a security paper, comprising a one- or multilayered paper layer within which a security thread 2 is embedded. The security thread is made of a transparent material, e.g. synthetic material, in one surface of which a relief structure 3 is impressed in the form of a plurality of cylinder lenses 4 disposed parallel one beside the another (FIG. 2). On the opposite surface there is a printed pattern that is basically composed, as shown in FIG. 2, of a plurality of individual stripes, e.g. three strips a, b and c. The individual stripes are visible separately at different viewing angles $\alpha, \beta, \gamma$. If the stripes are, for example, individual stripes of color with different coloration, the security thread changes its color when the document is slightly tilted. However, the printed pattern can also be designed in such a way that the individual stripes which are simultaneously visible at one viewing angle, for example, the stripes marked a, show a motive extending over the entire thread width and length. The thread can thus contain a plurality of mutually independent pieces of information, which can then be read out separately at different viewing angles.

Figure 3:
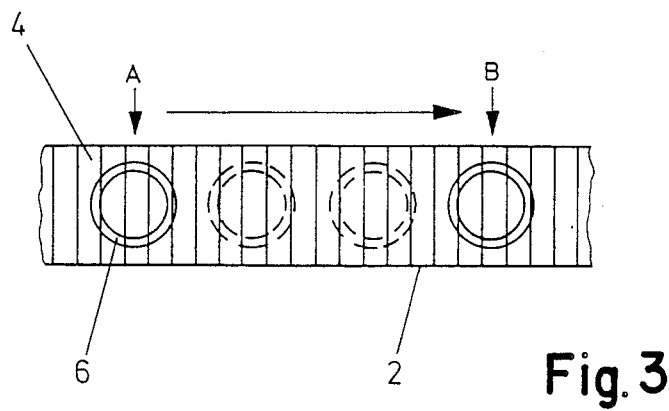
FIG. 3 shows a schematic view of a special embodiment.

A further possibility of design is shown in FIG. 3. Cylinder lenses 4 here extend at right angles to the thread direction. A motive, e.g. a ring 6, is printed at recurrent distances in correlation with the cylinder lenses in such a way that its position shifts on the thread when the viewing angle changes and the motive moves form a first position A to a second position B when the card is slightly tilted. The viewer is thus given the impression of a "moving" image. The motive, in this case a ring, must of course be divided into corresponding stripe images and these individual stripes printed on in such a way with respect to the position of the cylinder lenses that these stripes combine again to form a ring when the thread is viewed through the cylinder lenses and the ring's position shifts on the thread when the viewing angle changes. The individual stripes which contribute to represent a ring are printed in the running direction of the thread each offset a certain distance from the cylinder lens center. It is of course just as possible to use the tilt image effect on cross-striped security threads, as to use the moving image effect in the case of threads with lengthwise striping. It is also conceivable to combine the two effects on one security thread.

The thickness d of the security thread and the radius of curvature of the cylinder lenses are selected in accordance with the refractive index of the thread material in such a way that the printed pattern is preferably located on the plane of focus of the cylinder lenses.

Figure 1:
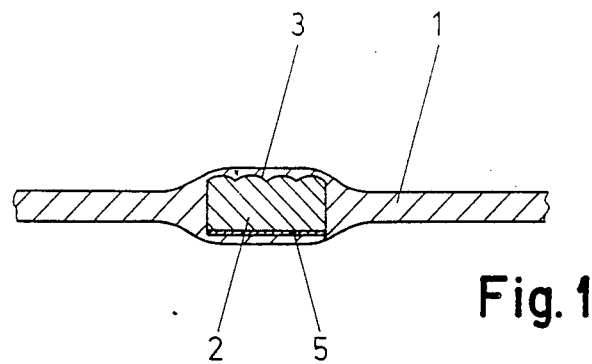
FIG. 1 shows an antifalsification document with a security thread embedded therein, in a cross-sectional view.
Figure 2:
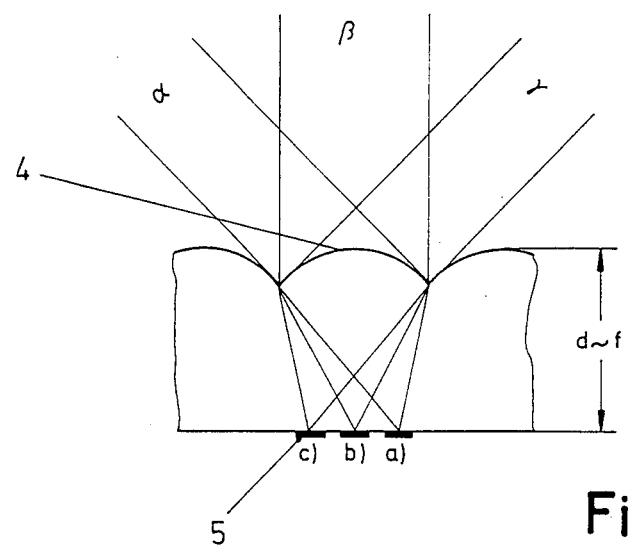
FIG. 2 shows an inventive security thread in a cross-sectional view.

Antifalsification documents, such as bank notes, generally have a thickness of approx. $100\mu$. The thread embedded therein should therefore not exceed an overall thickness d of approx. $70\mu$. The necessary radius of curvature of the cylinder lenses is calculated, assuming a refractive index of the thread material of 1.5, as is customary for synthetic materials, according to the formula $d=3\times r=f$, wherein f is the focal distance of the lens. For the stated film thickness, one thus obtains approx. 20 lenses per mm. Stripes a, b, c (instead of written characters, etc.) shown in FIG. 2 must in this case be printed on with an individual stripe width of approx. $16\mu$.

If, for a film thickness of approx. $70\mu$, one selects a lenticular screen of 10 lenses per mm with a correspondingly larger radius of curvature, the individual stripes of the printed pattern are only shown fuzzily, on the one hand, which provides the possibility, on the other hand, of printing the stripes in twice their width, which is easier to realize technically. Since the stripes only allow for a homogeneous color effect across each entire lens width anyway, this fuzziness of the lines across the width of the security thread does not disturb the overall impression.

Although in the latter embodiment the stripe width may be approximately $30\mu$, such a printed pattern is still extremely demanding in terms of the printing quality. For forgers equipped with simple means, such a printed pattern cannot be reconstructed. In spite of this fine line pattern, however, the security thread is testable by the viewer without aids such as magnifying glasses or the like, since at the particular viewing angles he can detect large-area color effects each extending over the entire security thread width.

Instead of cylinder lenses, other embossed structures which also have a focusing effect, such as spherical lenses or honeycomb lenses, may also be provided. The printed pattern must then of course be adapted to the optical conditions of the particular type of lens.

Figure 8:
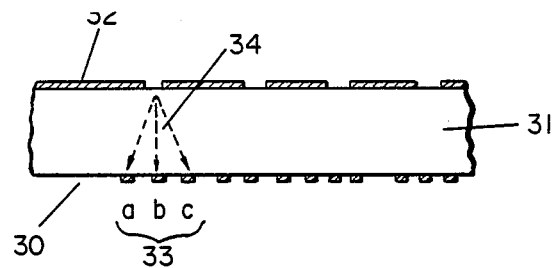
FIG. 8 shows a security thread with printing on opposing surfaces.

Further, instead of using lenses one can also take measures which have a similar optical effect in order to obtain an appearance of the thread that changes depending on the viewing angle (FIG. 8). For example, a security thread 30 consisting of a transparent film 31 can be printed on both sides, the printed pattern 32 on one side of the film being designed so as to expose to the viewer, depending on the viewing angle 34, different areas of 33a, b, c of the printed pattern of the thread on the back facing away from the viewer. For example, the film forming the security thread is printed on one side with a line screen or a negative dot screen. When the screen structures and the film thickness are designed accordingly, these screens act like diaphragms which limit the field of vision, so that depending on the viewing angle only certain limited areas of the opposite surface of the film are visible. If the printed pattern located on the opposite surface of the film is designed in accordance with this diaphragm structure, it is possible to produce security threads which change their visual appearance, such as the color, design, etc., when the viewing angle changes.

Figure 9:
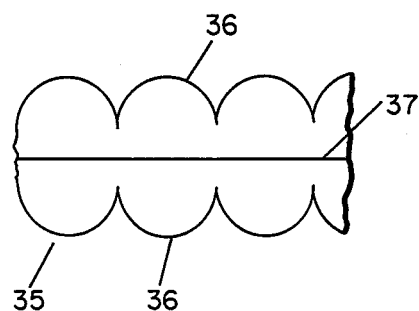
FIG. 9 shows a security thread with lens structure disposed on opposing surfaces.

In a further embodiment (FIG. 9), the optical structure, such as the lens structure 36 is provided on two opposite surfaces of a substantially rectangular security thread 35 and the printed pattern 31 accordingly disposed preferably on the center plane of the thread. The lenses 36 located opposite each other can be of the same type and be disposed congruently or else offset from each other.

Figure 10:
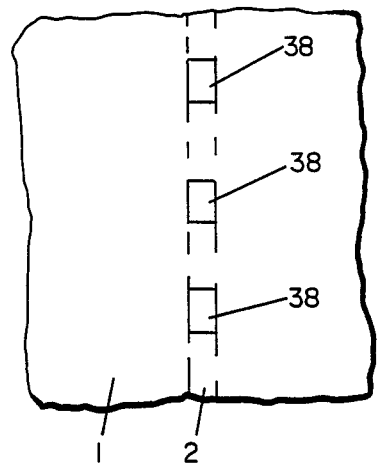
FIG. 10 shows a document with apertures aligned with a security thread. cDETAILED DESCRIPTION OF THE PREFERRED EMBODIMENT

FIG. 10 shows a security paper 1 with a security thread 2 embedded therein, which appears through holes 38 at the surface of the paper.

Figure 4:
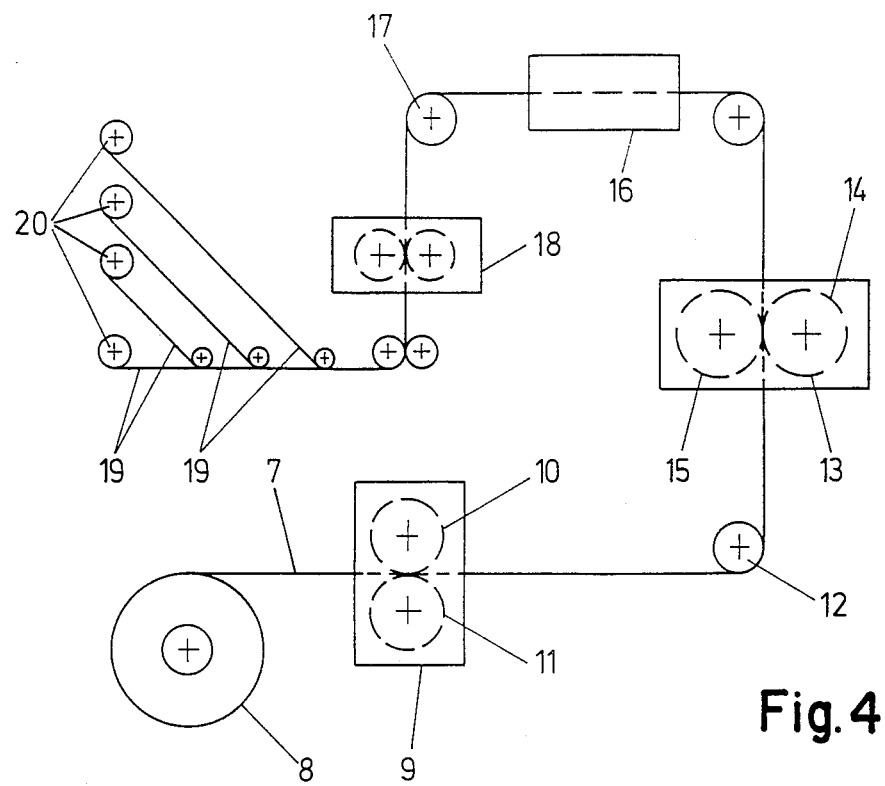
FIG. 4 shows a diagrammatic view of an apparatus for producing these security threads, FIGS. 5a, b show a film and a corresponding guide roll.

FIG. 4 shows an apparatus for producing security threads, whereby the cylinder lenses extend in the longitudinal direction of the thread.

A wide film length 7 is removed from a supply roll 8 and fed to an impressing unit 9 in which the cylinder lenses are impressed in the longitudinal direction of the film length, for example by means of a calender roll 10 and a mating roll 11. The impressed film length is then deflected via a guide roll 12 and fed to printing apparatus 13 in which the printed pattern is provided on the unimpressed side of the film. Printing apparatus 13 contains one or more printing cylinders 14 with mating rolls 15 located opposite. Between the individual printing cylinders the film can again be directed over guide rolls in order to ensure that it is guided in exact register with the individual printing units. To dry the print, the film is then directed into a drying unit 16 so that, after being reversed via a further guide roll 17, the film can be fed to a cutting unit 18. There the film length is cut into strips or threads 19 and the strips or threads wound onto separate rolls 20.

Figure 5A:
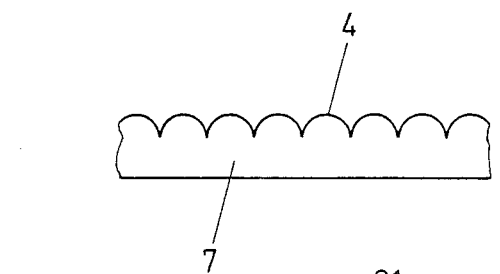
Figure 5B:
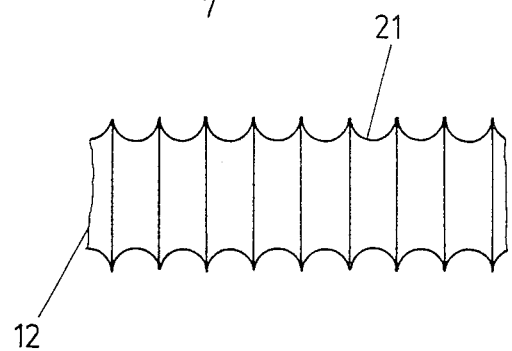

According to the invention at least guide rolls 12 and 17 are equipped with a relief structure 21 that is negative with respect to the lenticular screen worked into the film in the impressing unit. FIG. 5a shows the film with impressed cylinder lenses 4, and FIG. 5b shows corresponding guide rolls 12, 17 with corresponding negative structure 21. These guide rolls are mounted in fixed spatial assignment to the printing and cutting apparatus, thereby ensuring that the film is always printed and cut in the correct geometrical assignment to the cylinder lenses already located on the film. For better guidance of the film, it is deflected by guide rolls 12 and 17, preferably by 90°, to obtain a maximum angle of contact.

Figure 6:
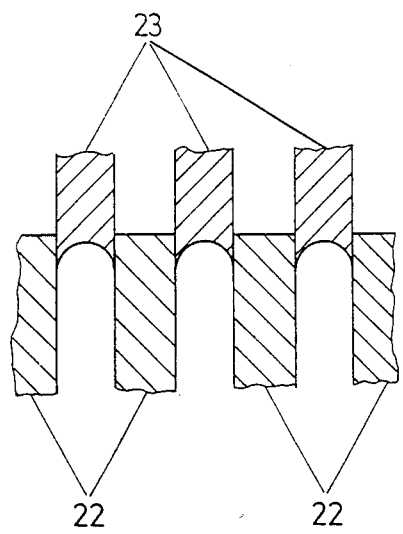
FIG. 6 shows a cutting apparatus, FIGS. 7a, b show a further film with a corresponding guide roll.

FIG. 6 shows a cutting means 18 as preferably used for cutting the film length into narrow strips. The cutting means comprises several cutter disks 22, 23 mounted on two rotary axles, said disks meshing with each other. The width of the disks corresponds to the desired thread width. In order not to destroy the lenticular structure on the film, the front of disks 23, which come in contact with the impressed side of the film, is milled. At the same time this milling also increases the cutting action of the disks.

In addition to the guide rolls, there may be provided, for example, before the printing or cutting means, mechanical or optical pick-up elements (not shown in the Figures) which, in the manner of a pick-up cartridge, engage the grooves between the cylinder lenses and monitor the run of the film length. If required, small readjustments can be performed in the run of the film length on the basis of the pick-up signals.

In the preferred embodiment shown here, the various procssing steps, such as simpressing, printing and cutting, are performed one directly after the other. However, the individual processing steps may also be performed independently of one another in space and in time. For this purpose, the already partly worked film is wound onto storage rolls and stored intermediately until the next processing step. Since the film is provided with the lenticular screen in the first processing step and the subsequent steps are controlled with reference to this lenticular screen, it is possible to separate the individual processing steps without any problem.

This method thus makes it possible to produce narrow strips or threads exhibiting a printed pattern that extends over great lengths in exact register, i.e. exactly positioned in the longitudinal direction of the strip, and is furthermore precisely positioned with respect to the outer dimensions of the thread or the center of the thread.

When paper web is being manufactured, security threads are embedded continuously in the sheet-forming furnish layer or between two paper layers that are still moist. Since this process should be interrupted as little as possible, it is particularly necessary in this case for the threads to exist in sufficient lengths (several kilometers). However, this means that the threads must be printed and cut over the same distances in exact register with the cylinder lenses. The inventive method makes it possible to meet these requirements, thereby opening the way for exploiting the described optical effects to protect security threads against falsification, whereby these effects are testable easily and without optical aids and can only be imitated at high technological expense.

However, this method may also be used to make threads which have a printed pattern extending lengthwise on the thread or a surface structure only on one side, and a smooth surface on the other side.

Figure 7A:
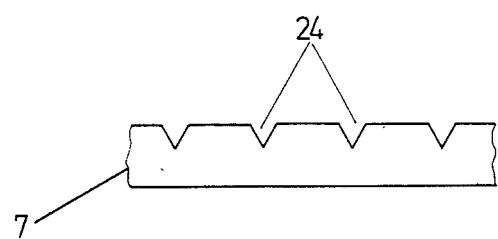
Figure 7B:
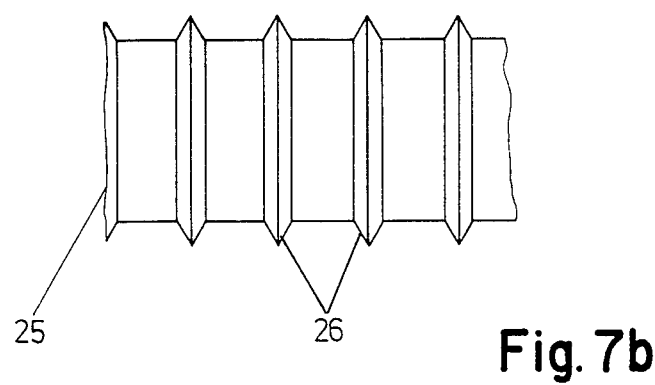

As shown in FIG. 7a, grooves 24 are impressed for this purpose in film length 7. at certain intervals corresponding, for example, to the subsequent thread width or an integral multiple thereof, said grooves extending lengthwise on the film length. For further processing, the film is aligned and adjusted via guide rolls 25 (FIG. 7b), which in turn have negative groove pattern 26 worked into them, thereby allowing for exact printing, impressing, milling and/or cutting in accordance with the position of the grooves. These grooves may also be so deep that they simultaneously serve as tear lines along which the film may be separated into individual strips after processing. The inventive method for processing films in exact register may also be used for superimposing two or more films in exact mutual alignment and then gluing or welding them together, or providing them on a base that is, for example, already provided with a printed pattern.

We claim:

1. An antifalsification document comprising a security thread embedded within the document, wherein said security thread is made of a transparent material;
   a first side of said security thread exhibits a printed pattern;
   a second side of said security thread spaced away from said printed pattern, defining an outer surface area of said security thread, exhibits an optically effective structure wherein when said printed pattern is viewed through said optically effective structure different areas of said printed pattern are recognizable at different viewing angles, and
   wherein said printed pattern is configured so that an optical appearance of said security thread changes when viewing angle changes.

2. An antifalsification document according to claim 1, wherein said optically effective structure is a relief structure comprising at least one individual lens.

3. An antifalsification document according to claim 2, wherein said individual lenses are cylinder lenses aligned lengthwise to a longitudinal extent of said security thread.

4. An antifalsification document according to claim 2, wherein said individual lenses are cylinder lenses aligned perpendicular to a longitudinal extent of said security thread.

5. An antifalsification document according to claim 1, wherein said optically effective structure comprises partially transparent surface layer areas arranged to create a diaphragm effect and include transparent and opaque areas.

6. An antifalsification document according to claim 1 wherein said security thread exhibits a substantially rectangular cross-section and said printed pattern and optically effective structure are disposed on opposite surfaces of said security thread.

7. An antifalsification document according to claim 1 wherein said security thread exhibits a substantially rectangular cross-sectional shape, and wherein said security thread comprises optically effective structures on opposite surfaces, and said printed pattern is disposed on an inner layer plane of said security thread substantially parallel to said opposite surfaces.

8. An antifalsification document according to claim 1, wherein said antifalsification document is a security paper.

9. An antifalsification document according to claim 8 wherein said security thread is superimposed only by a substantially transparent thin paper layer.

10. An antifalsification document according to claim 1 exhibiting at least partially transparent areas or openings in the area of said security thread.

11. An antifalsification document according to claim 1, wherein said printed pattern is configured so that a piece of information is visible from a first viewing angle range and not visible outside said first viewing angle range.

12. An antifalsification document according to claim 11, wherrein said information is a coloration.

13. An antifalsification document according to claim 11, wherein said information is writing.

14. An antifalsification document according to claim 1, wherein said printed pattern is configured so that information appears at locally different places on said security thread at different viewing angles.

15. A method for processing films in exact register comprising at least two mutually independent processing steps wherein a second and subsequent processing steps are performed in exact register with a first processing step,
said first processing step comprises providing said film with a first relief structure capable of being picked up mechanically; and
a second step of utilizing at least parts of said relief structure for processing said film in exact register in a subsequent processing step, where exact register is maintained by action of the tools with guide elements exhibiting a second relief structure, negative to said first relief structure.

16. A method according to claim 15, comprising subsequent processing steps of printing on said film, and cutting said film.

17. A method according to claim 16, wherein said impressing step is said first step and impresses a screen exhibiting a plurality of adjacent parallel cylinder lenses disposed in said film, and wherein at least some of said cylinder lenses operate as guide elements.

18. A method according to claim 17, wherein said step of printing comprises printing at least one pattern exhibiting a plurality of stripes arranged parllel to said cylinder lenses on an opposing surface of said film to said cylinder lenses so as to register exactly with the cylinder lenses so that said stripes are visible separately at different viewing angles due to focusing effect of said cylinder lenses.

19. A method according to claim 17, wherein said cutting step is subsequent to said printing step and further comprises cutting said film into individual strips by two meshing cutter blocks exhibiting a plurality of individual disks where a side of said disks contacting an impressed side of said film exhibits depressions coordinated with profiles of said cylinder lenses.

20. A method according to claim 16, wherein said printing step is performed in a plurality of individual steps by individual printing units each containing guide devices exhibiting said second relief structure.

21. A method according to claim 20, wherein different colors are printed on said film in said individual steps.

22. A method according to claim 16, wherein said step of printing further comprises printing a microprint on said film.

* * * * *